(12) United States Patent
Gutmann

(10) Patent No.: US 8,142,289 B2
(45) Date of Patent: Mar. 27, 2012

(54) DEAD RECKONING IN A GAMING ENVIRONMENT

(75) Inventor: Robert Gutmann, Puyallup, WA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 289 days.

(21) Appl. No.: 11/479,829

(22) Filed: Jun. 30, 2006

(65) Prior Publication Data

US 2008/0005172 A1    Jan. 3, 2008

(51) Int. Cl.
*A63F 9/00* (2006.01)
(52) U.S. Cl. .................... 463/42; 707/100; 707/104.1
(58) Field of Classification Search ............ 463/42
See application file for complete search history.

(56) References Cited

U.S. PATENT DOCUMENTS

| | | | | |
|---|---|---|---|---|
| 5,879,236 A | * | 3/1999 | Lambright | 463/42 |
| 6,801,930 B1 | * | 10/2004 | Dionne et al. | 709/205 |
| 7,181,494 B2 | * | 2/2007 | Lavoie et al. | 709/205 |
| 2002/0143781 A1 | * | 10/2002 | Lavoie et al. | 707/100 |
| 2004/0078369 A1 | * | 4/2004 | Rothstein et al. | 707/7 |
| 2006/0227372 A1 | * | 10/2006 | Takayanagi | 358/1.15 |
| 2007/0265089 A1 | * | 11/2007 | Robarts et al. | 463/42 |

OTHER PUBLICATIONS

Aronson, Jesse. "Dead Reckoning: Latency Hiding for Networked Games". Sep. 19, 1997. <http://www.gamasutra.com/features/19970919/aronson_01.htm>.*

* cited by examiner

*Primary Examiner* — Melba Bumgarner
*Assistant Examiner* — Seng H Lim
(74) *Attorney, Agent, or Firm* — Lewis and Roca LLP

(57) ABSTRACT

Client position in a multi-client game is determined using dead reckoning. Clients send information to a server over a network. The server distributes this information to other clients. A client uses this information and dead reckoning to determine a character's position. The server may calculate the client's position using dead reckoning and send updates to clients when errors between actual and calculated positions exceed a threshold. Clients may calculate their position according to dead reckoning, and when an error between actual and calculated position exceeds a threshold, send updated information to other clients. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

70 Claims, 8 Drawing Sheets

DEAD RECKONING IN A GAMING ENVIRONMENT

FIELD OF THE INVENTION

The present invention relates generally to video gaming and, more particularly, to on-line video gaming.

BACKGROUND OF THE INVENTION

Growth of the electronic entertainment industry has introduced new challenges for effectively transferring information between clients, or players. For example, many new video games allow multiple players to participate in the same game environment. Some newer games support multiple clients participating in a game environment using a wide or local area network, such as the Internet or other network, to transfer data between the clients.

As video games increase in sophistication and complexity the amount of data exchanged between players also increases. The increase in data exchanged between players places increased demands on the network. Increases in the amount of data transferred between players can cause decreased game performance, even with broadband network connections, such as DSL and cable modems.

Thus, there is a need for improved, more efficient, techniques for transferring data between players in an electronic gaming environment. The present invention satisfies this need.

SUMMARY OF THE INVENTION

In accordance with the invention a method and apparatus for improved, more efficient, techniques for transferring data between players in an electronic gaming environment is described. In one embodiment, clients send information to a server over the Internet. This client information may include, but is not limited to, character position, character velocity, character acceleration, and non-character information that may relate to the client's ability to process data in a timely manner. The server sends client information for other clients to each client. The client uses dead reckoning to determine the position of the character on the other clients. In one embodiment, the server also calculates all of the clients position using dead reckoning and sends updates to clients when errors between one of the characters actual position and dead reckoning position exceeds a threshold for that client. In other embodiments, clients can calculate their own position according to dead reckoning, and when an error between their actual position and the dead reckoning position is exceeds a threshold, send updated position and velocity data to the server or directly to other clients.

In one embodiment of the present invention, a server receives client information including, but not limited to, initial position and velocity data from a client. The server then sends a portion of that client's information, such as, its position and velocity data to other clients. The server continues to receive client information updates from clients and may calculate a dead reckoning position for each client. When the server determines an error between the dead reckoning position and an actual position for any of the clients exceeds a threshold level for any other client, the server sends updated client information for the client whose errors exceed the threshold level to the other clients. The position and velocity data can be sent through the Internet or any other network. Also, each client can have a unique error threshold for each other client. That is, individual error thresholds can be set for individual clients relative to each other.

In another embodiment, a client sends its client information to a server. The client also receives client information of other clients from the server. The client then calculates a dead reckoning position for the other clients. The client also determines if updated client information has been received from the server, and if it has, updates the client information for the other clients in response to updated information received from the server.

In yet another embodiment, a client sends client information directly to other clients, and receives client information direct from the other clients in a peer-to-peer configuration. The client calculates a dead reckoning position for itself and the other clients. The client determines if an error between its calculated dead reckoning position and its actual position exceeds a threshold level for any other client, and if it does, sends updated client information for itself to the other clients.

These and other features and advantages of the present invention will be appreciated from review of the following detailed description of the invention, along with the accompanying figures in which like reference numerals refer to like parts throughout.

BRIEF DESCRIPTION OF THE DRAWINGS

Various embodiments of the present invention taught herein are illustrated by way of example, and not by way of limitation, in the figures of the accompanying drawings, in which.

Figure 1:
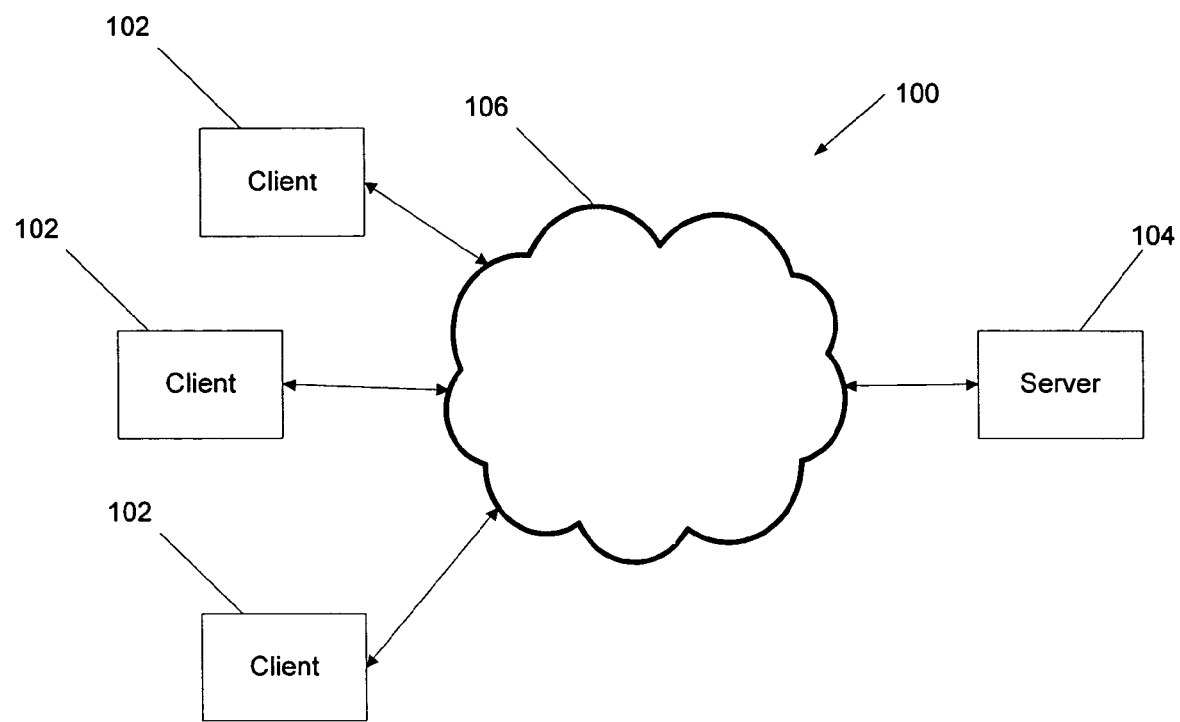
FIG. 1 is a block diagram of an exemplary system configured for on-line gaming in accordance with aspects of the invention.

It will be recognized that some or all of the figures are schematic representations for purposes of illustration and do not necessarily depict the actual relative sizes or locations of the elements shown. The figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. While this invention is capable of embodiment in many different forms, there is shown in the drawings and will herein be described in detail specific embodiments, with the understanding that the present disclosure is to be considered as an example of the principles of the invention and not intended to limit the invention to the specific embodiments shown and described. That is, throughout this description, the embodiments and examples shown should be considered as exemplars, rather than as limitations on the present invention. Descriptions of well known components, methods and/or processing techniques are omitted so as to not unnecessarily obscure the invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The explosive growth in the electronic entertainment industry has introduced new challenges to support new games, such as on-line games. For example, on-line games may allow multiple clients, or players, in remote locations to interact in a gaming environment. As the clients play the game, data relative to the clients is exchanged between the multiple clients. In many games, the clients control the movements of a character in the game. As the client, moves the character, information about that character's movement must be sent to the other clients participating in the game. Transferring the data about a character's movement can significantly increase the bandwidth requirements of the network.

One feature of the present invention is that it provides a method of updating one client's character position and other information on another client across a network using a dead reckoning technique that can reduce the bandwidth required to play a multi-client game across the network.

FIG. 1 is a block diagram of an exemplary system configured for on-line gaming in accordance with aspects of the invention. As illustrated in FIG. 1, the system 100 includes at least one client 102. Typically, there may be multiple clients 102 in the system. The system 100 also includes a server 104 and a network 106 that provides connectivity between clients 102 and server 104. The network 106 in system 100 may be referred to as a client-server network since it comprises a plurality of clients 102 communicating with a server 104. A network 106 may include a wide area network, a local area network, a wireless network, a personal area network, the Internet, or any other network. As described further below, in one embodiment, clients 102 send information to server 104. As used herein "client information" may include but is not limited to information related to the game character on the client such as character position, character velocity, and character acceleration. This information may be expressed in multiple dimensions. Additionally, the "client information" may include non-character information such as information related to the client's ability to process data in a timely manner. Server 104 may then send the client information, or a portion thereof, to other clients 102 participating in the game. To reduce the amount of data that is transmitted across network 106, a form of "dead reckoning" may be used.

Figure 2:
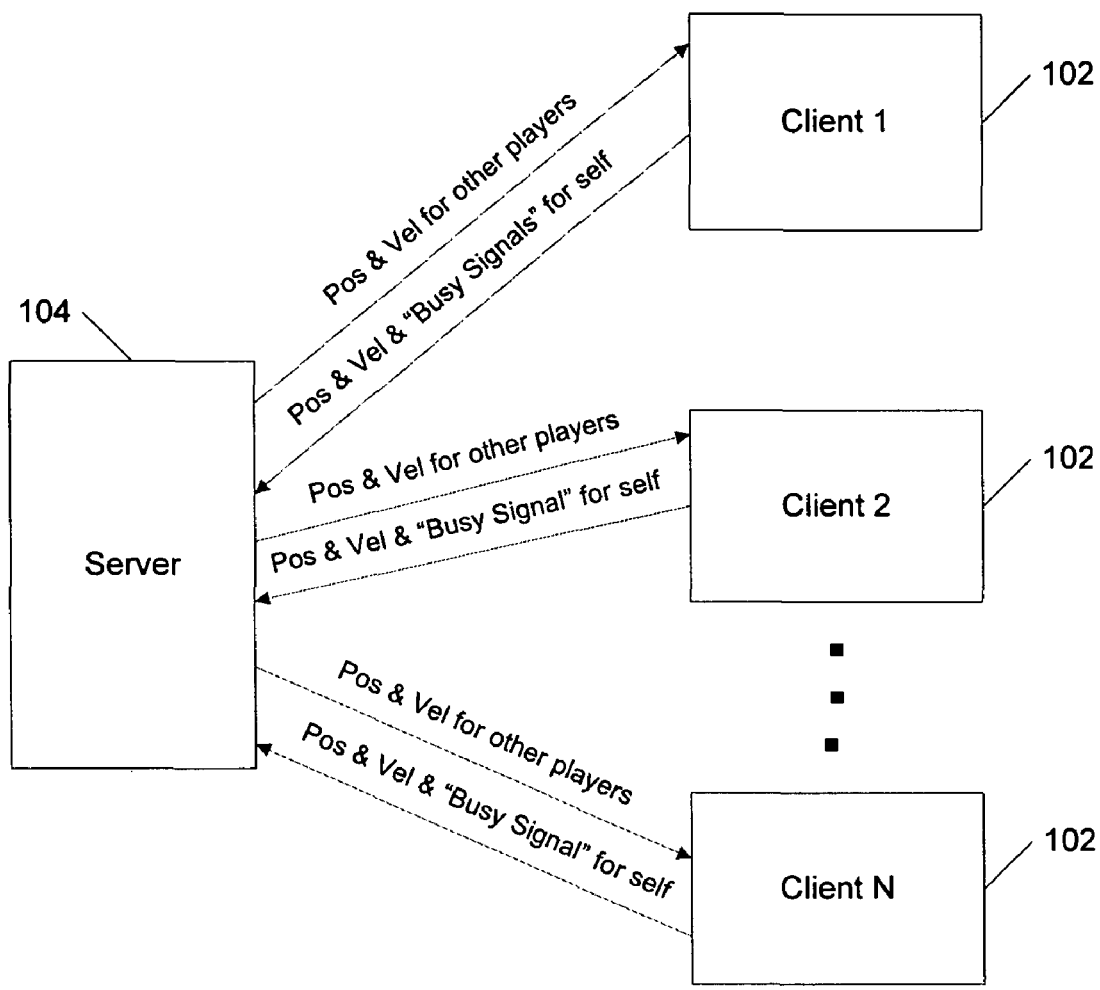
FIG. 2 is a block diagram illustrating an example of information sent between multiple clients in an on-line game.

FIG. 2 is a block diagram illustrating an example but not a limitation of the information sent between multiple clients 102 and server 104 in an on-line game. As illustrated in FIG. 2, clients 102 may report location information about their respective character to the server 104. This location information may include a position and velocity of the characters. In other embodiments, other information, such as acceleration, can also be included in the location information. Additionally, other information may be exchanged between clients 102 and server 104. This other information may include information related to client 102's current status such as a "busy signal".

Figure 3:
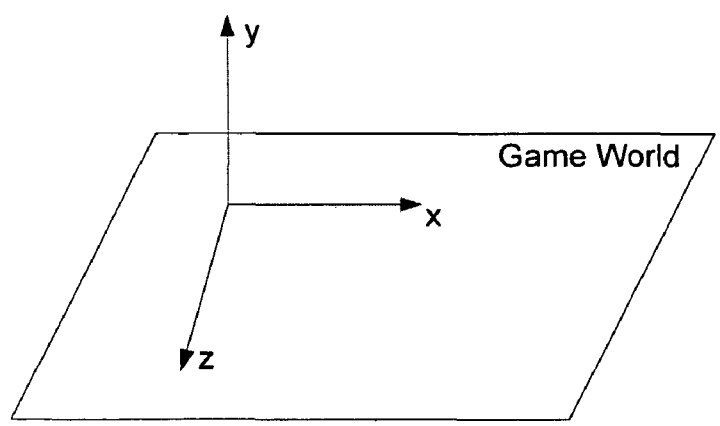
FIG. 3 is a diagram illustrating directions in a game world environment.

FIG. 3 is a diagram illustrating directions in a game world environment. As illustrated in FIG. 3, position and velocity in the game world can be represented as either three-dimensions, that is with x, y, and z components, or two-dimensions, with x and z components.

Returning to FIG. 2, clients 102 can report their positions on any schedule a game designer chooses. For example, the clients 102 can report their positions at purely periodic times, threshold-based times, or any combination of these two, or by any other schedule. Typically, the schedule is set to ensure accurate reporting of client information from each client 102 to server 104.

In one embodiment, server 104 initially receives and immediately reports each position and velocity to every other client 102 in the game. Server 104 may save a copy of this data for future reference along with the time the data was received. Server 104 may also save a value called an "error threshold" for each client 102 relative to each other client 102 in the game. The error threshold is given by $\epsilon_k$ for the $k^{th}$ client 102 in the game. In one embodiment, server 104 may save the following data:

$P_{ik_x}^{save}$ x-position for $i^{th}$ client 102 last sent to $k^{th}$ client 102
$P_{ik_y}^{save}$ y-position for $i^{th}$ client 102 last sent to $k^{th}$ client 102
$P_{ik_z}^{save}$ z-position for $i^{th}$ client 102 last sent to $k^{th}$ client 102
$V_{ik_x}^{save}$ x-velocity for $i^{th}$ client 102 last sent to $k^{th}$ client 102
$V_{ik_y}^{save}$ y-velocity for $i^{th}$ client 102 last sent to $k^{th}$ client 102
$V_{ik_z}^{save}$ z-velocity for $i^{th}$ client 102 last sent to $k^{th}$ client 102
$t_{ik}^{save}$ time last data about $i^{th}$ client 102 was sent to $k^{th}$ client 102
$\epsilon_k$ for the current error threshold When $k^{th}$ client 102 receives information (from server 104) regarding $i^{th}$ client 102 it may save all of the above data except for $\epsilon_k$ (which it may not receive). The $k^{th}$ client 102 assumes that the position data it just received regarding the $i^{th}$ client 102 is the present position for the player and that future positions are give by the dead reckoning algorithm:

$$P_{i_x}(t) = P_{i_x}^{save} + V_{i_x}^{save} \times (t - t_i^{save})$$

$$P_{i_y}(t) = P_{i_y}^{save} + V_{i_y}^{save} \times (t - t_i^{save}) \text{ (three-dimensional component saves)}$$

$$P_{i_z}(t) = P_{i_z}^{save} + V_{i_z}^{save} \times (t - t_i^{save})$$

where:
t is some future time ($t \geq t_i^{save}$)
$P_i(t)$ is an estimate of future position of client i
(note the subscript k is unnecessary)

In one embodiment of the present invention the client 102 will continue to use the position calculated by dead reckoning until notified otherwise by server 104.

As new client information arrives at server 104 for the $i^{th}$ client 102 in the game, server 104 may compute the following error quantity, $\delta_k$ for each other client 102 in the game ($i \neq k$):

$$\delta_x = P_{ik_x}^{save} + V_{ik_x}^{save} \times (t - t_{ik}^{save}) - P_{i_x}$$

$$\delta_y = P_{ik_y}^{save} + V_{ik_y}^{save} \times (t - t_{ik}^{save}) - P_{i_y}$$

$$\delta_z = P_{ik_z}^{save} + V_{ik_z}^{save} \times (t - t_{ik}^{save}) - P_{i_z}$$

$$\delta_k = \sqrt{\delta_x^2 + \delta_y^2 + \delta_z^2}$$

where:
$P_{i_x}$ is the x-position just arrived from the $i^{th}$ client 102
$P_{i_y}$ is the y-position just arrived from the $i^{th}$ client 102
$P_{i_z}$ is the z-position just arrived from the $i^{th}$ client 102
t is the current time It should be noted that $\delta_k$ represents the calculated error between the position just reported by the $i^{th}$ client 102 and the dead reckoning model run by $k^{th}$ client 102 for the $i^{th}$ client 102.

In one embodiment of the present invention server 104 passes on a portion of the client information just arrived from the $i^{th}$ client 102 to the $k^{th}$ client 102 only if $\delta_k > \epsilon_k$. Stated otherwise, server 104 only sends client information if the calculated error between the position reported and the dead reckoning position exceeds the error threshold. That is, if the output of the dead reckoning model is deemed to be "good enough", then the new data is not passed on to client 102, thus reducing the amount of data sent on network 106. One feature of this embodiment is that the overall bandwidth usage of the multi-client game on network 106 may be reduced.

In another embodiment of the present invention provides a method by which a client 102 sends other non-character information to server 104. In this embodiment the other information may contain "busy" or other signals that indicate that the $k^{th}$ client 102 finds that it is too busy to process all of the incoming data from server 104, client 102 may send a message to server 104 indicating this condition. Server 104, in turn, can increase the error threshold $\epsilon_k$ for that client 102. An increased $\epsilon_k$ will cause updates to that client 102 to happen less frequently thus further reducing the amount of data being sent to that client 102 on network 106. This may additionally reduce overall network traffic. When the $k^{th}$ client 102 finds its processing load returning to normal, a message indicating this fact may be sent to server 104. Server 104 could then decrease error threshold $\epsilon_k$. Several levels of error threshold $\epsilon_k$ can be defined, thus allowing performance across the network to degrade gracefully in extremely busy network conditions.

In another embodiment, the dead reckoning technique can be performed in only two dimensions. For example, referring to FIG. 3, one of the components, like the y-component, can be dropped from the dead reckoning calculation. Reducing the number of components in the dead reckoning calculation reduces the amount of data server 104 needs to save for each client 102. In the example described, the data storage requirement is reduced by approximately one third.

In yet another embodiment, server 104 may treat all clients 102 uniformly. For example, when it is determined that updated client information is to be sent, it is sent to all clients 102. In practice, this means that the subscript k can be dropped from the equations above. Treating all clients uniformly greatly reduces the amount of data that server 104 needs to store in order to implement the dead reckoning technique. One drawback to this embodiment can be if feedback is being implemented, in the form of "busy" messages described above, one client 102 being overloaded, may cause server 104 to treat all clients 102 as overloaded. Thus a certain degree of fine-tuning, or network 106 bandwidth optimization, may be lost in return for reduced data storage requirements.

Figure 4:
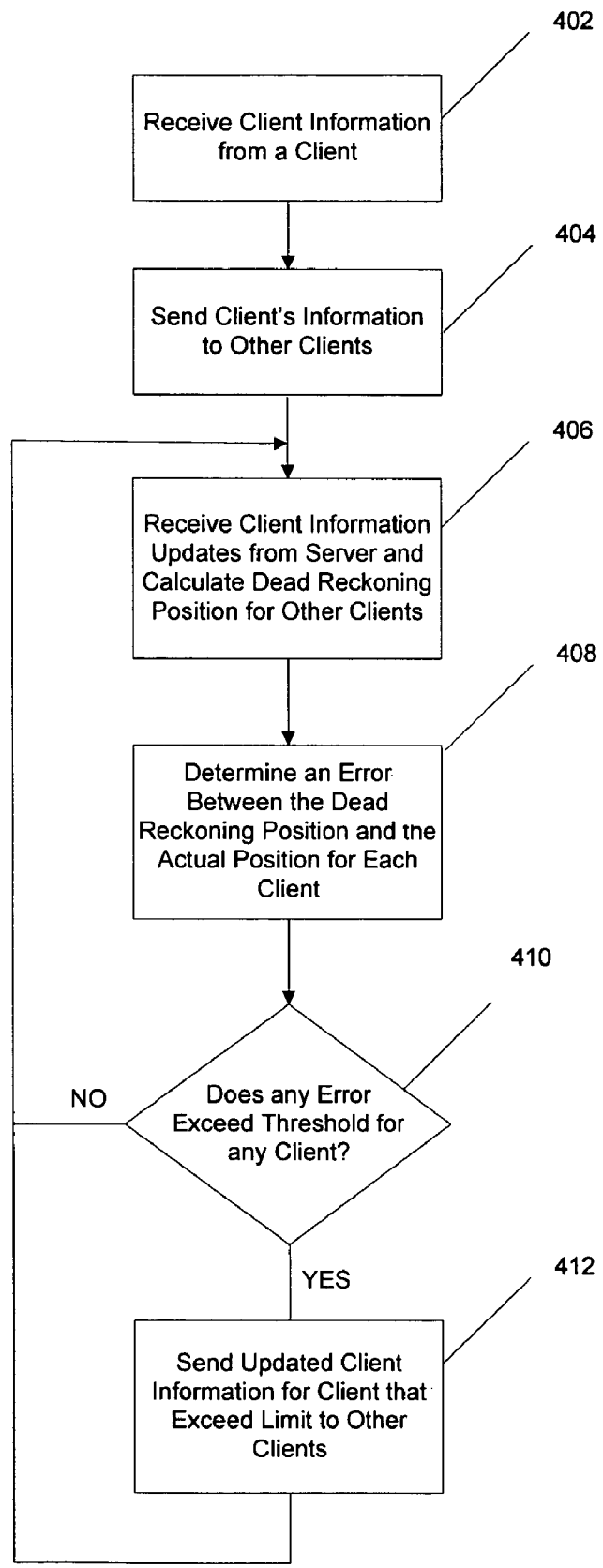
FIG. 4 is a flow chart illustrating an example of a dead reckoning technique consistent with one embodiment of the present invention.

FIG. 4 is a flow chart illustrating an example of a dead reckoning technique consistent with one embodiment of the present invention. Flow begins in block 402 where a client 102's information is received by server 104. Flow continues to block 404 where the received client information is sent to other clients 102. In block 406 a client 102 receives updates on other clients 102 from server 104. In addition to receiving the actual position of the clients 102, server 104 may calculate the dead reckoning position for each client 102. For example, server 104 may calculate a dead reckoning position in the same manner as clients 102 are calculating dead reckoning position for other clients 102. In this way, server 104 calculates the position that each client 102 calculates for the other clients 102, and server 104 also receives the actual position of each client 102 from the clients 102 themselves. As noted above, the information sent to other clients 102 may not contain all information received from client 102.

Flow continues to block 408 where server 104 determines an error between the calculated position and the actual position for each client 102. Then, in block 410 the error in position for each client 102 is compared against an acceptable "error level" or error threshold for each other client 102. In one embodiment of the present invention the error threshold can be different, for each client 102. In another embodiment the error threshold may be the same for all clients 102. For example, in a game, if a character on client 102 is a great distance from a character on another client 102 in game world environment, the error threshold for these clients 102 can be adjusted accordingly. In this example, the error threshold for these two clients 102 may be increased relative to each other because the clients 102 do not need great resolution due to their character's relative positions. Likewise, if the character's of two clients 102 are in close proximity to each other in the game world the error threshold may be decreased so that the clients 102 have more accurate information about the position of the character on the other client 102. Additionally, the client 102's error threshold may be adjusted on the basis of other characteristics that include but are not limited to the character's field of view, the clients 102 "busy status", or bandwidth considerations on network 106.

One feature of this embodiment is that the bandwidth use on network 106 can be optimized to provide more frequent updates to certain clients 102, while other clients 102 may receive updates less often. This optimization can more efficiently use the resources of network 106.

In another embodiment of the present invention, server 104 may disregard the relative position and other characteristics of the clients 102 and maintain a fixed error threshold for all clients 102. One feature of this embodiment is that the calculational requirements is reduced on server 104. Additionally, the error threshold, once set, may be static and the need to maintain different error thresholds for each client 102 relative to each other client 102 is reduced, further reducing the memory requirement on server 104.

In a further embodiment, server 104 may adjust client 102's error threshold responsive to non-character client 102 characteristics or network 106 characteristics. In this embodiment a client 102 that has sent a busy signal to server 104 may have its error threshold relative to other clients 102 increased so that it does not receive updates from server 104 as often. Additionally, server 104 may monitor network 106 traffic and increase all error thresholds for clients 102 as network 106 traffic increases thus providing a mechanism for more graceful degradation of game performance during peak network 106 traffic periods.

In block 410, if the calculated error exceeds the error threshold, flow continues to block 412 where updated client 102 information for the client 102 whose error exceed the threshold is sent to the other clients 102. As stated above, client 102 information is not limited to, but may include character position, velocity, acceleration, character field of view or non-character client 102 information such as busy signals. Flow then continues to block 406 and server 104 receives new client information from clients 102. Returning to block 410, if the error does not exceed the threshold flow continues to block 406 and server 104 receives new client information 102 from clients 102.

Figure 5:
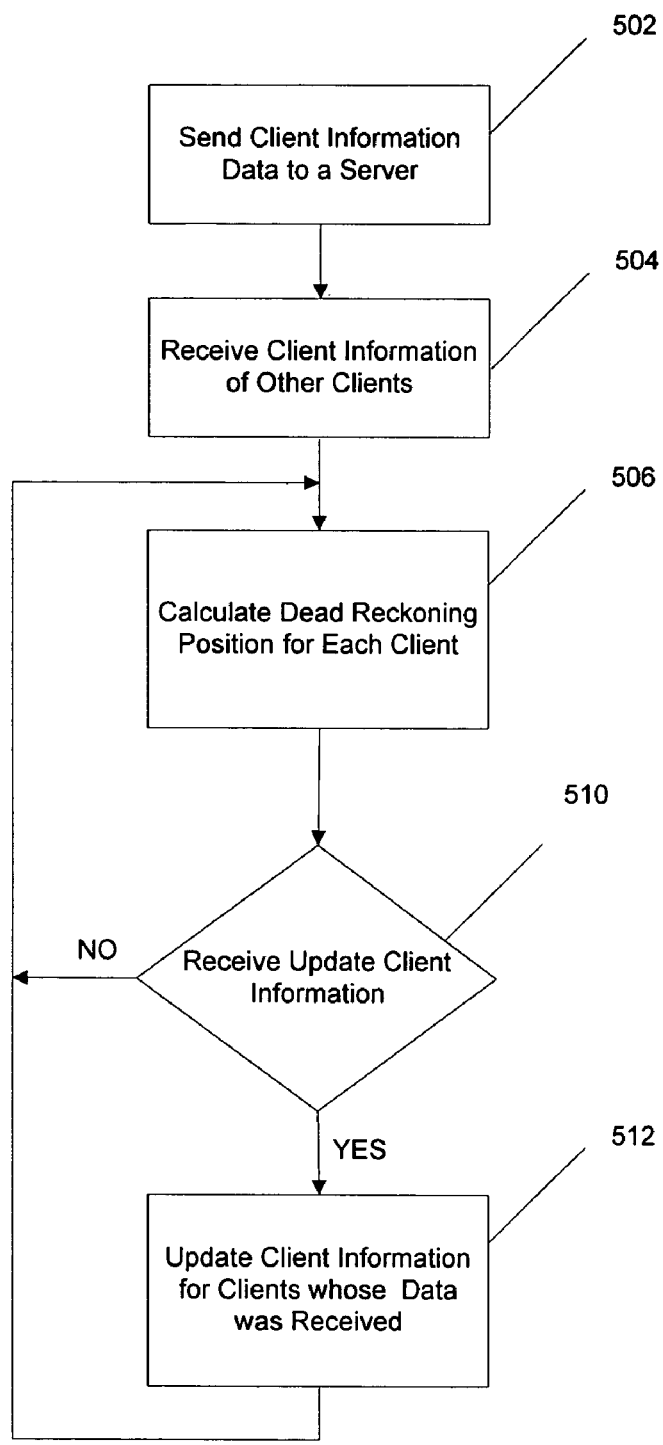
FIG. 5 is a flow chart illustrating an example of dead reckoning by a client.

FIG. 5 is a flow chart illustrating an example of dead reckoning by a client 102. Flow begins in block 502 where the client 102 sends it's client information to server 104. Flow continues to block 504 where a client 102 receives the client information of other clients 102 from server 104. In block 506 client 102 calculates the position of the characters on other clients 102 using dead reckoning. Flow continues to block 510, where client 102 checks to see if server 104 has sent update information, in the form of an update message, for any of the other clients 102. If update information has been received, flow continues to block 512 where the client information for that client 102 is updated. Flow then continues to block 506. Returning to block 510, if no update information has been received, then flow continues to block 506.

Figure 6:
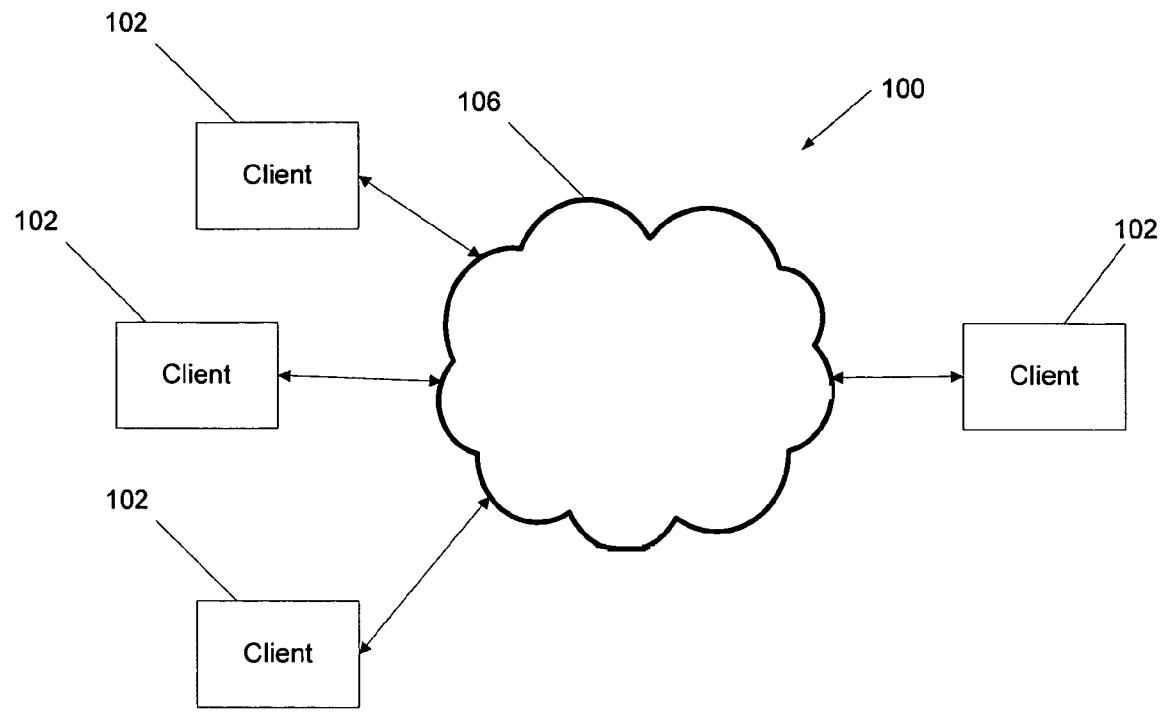
FIG. 6 is a block diagram of another exemplary system configured for on-line gaming.

FIG. 6 is a block diagram of another exemplary system configured for on-line gaming consistent with embodiments of the present invention. As illustrated in FIG. 6, there is no server involved in the game. This configuration may be referred to as a peer-to-peer network since a plurality of clients 102 are communicating directly with each other. As such, this configuration is often called a peer-to-peer gaming configuration. In this example, clients 102 exchange their client information directly to each other over network 106. Then each client 102 calculates each of the other clients 102 character's position using dead reckoning. In addition, each client 102 may calculate its own character's position using dead reckoning. When a client 102 determines that an error between its character's actual position, and the position as calculated by dead reckoning, exceeds a threshold for another client 102, the client 102 may then send updates of their client information to that other client 102.

Figure 7:
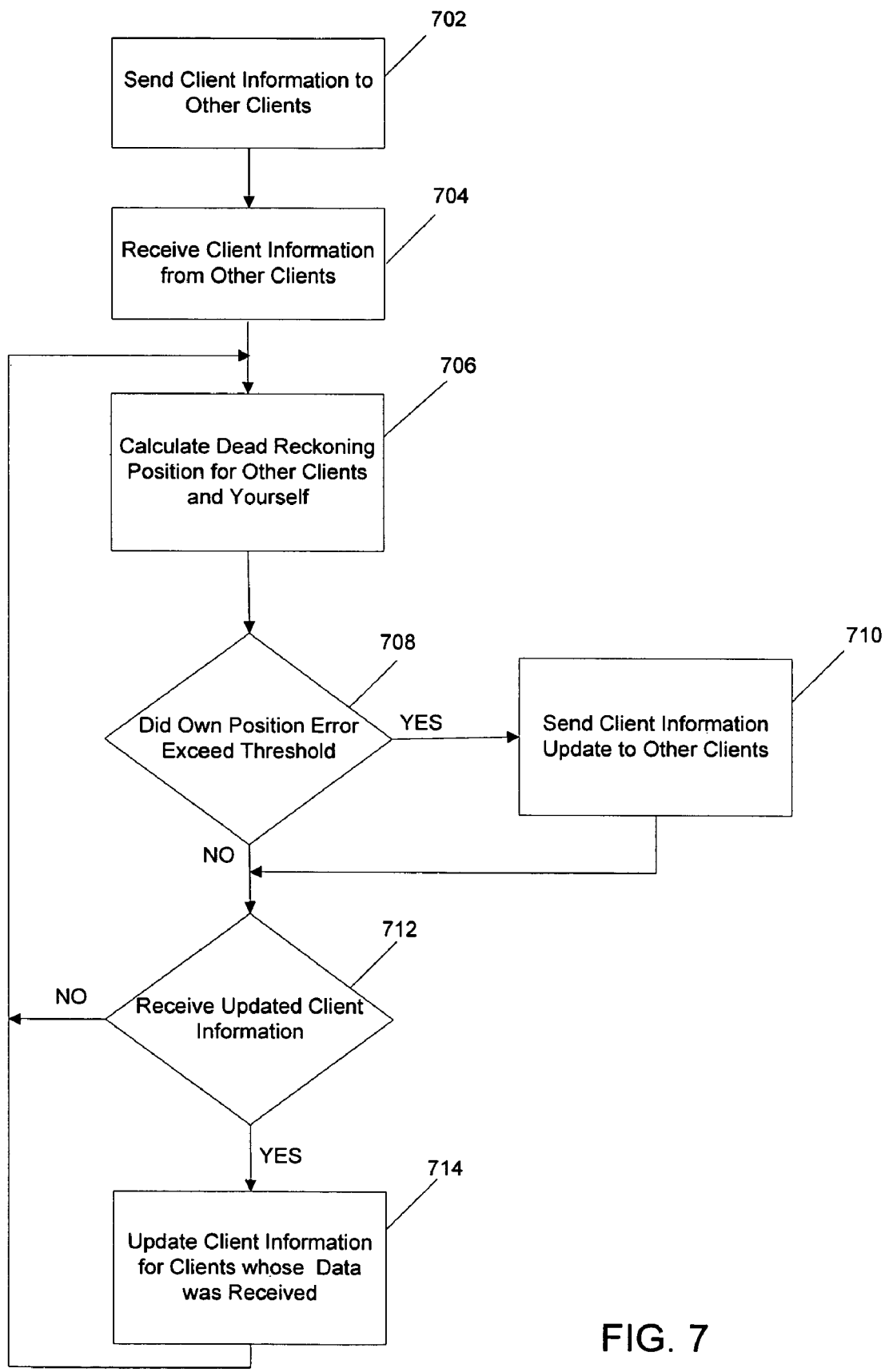
FIG. 7 is a flow chart illustrating another example of dead reckoning by a client.

FIG. 7 is a flow chart illustrating another example, consistent with one embodiment of the present invention, of dead reckoning by a client 102. Flow begins in block 702 where a client 102 sends its client information to another client 102. Flow continues to block 704 where the client 102 receives client information from the other clients 102. In block 706 the client 102 calculates their character's position, and the positions of characters on other clients 102 using dead reckoning. Flow continues to block 708, where the client 102 checks to see if the error in their character's actual position compared to the position calculated by dead reckoning, exceeds a threshold for any other client 102, in the form of an update information message. If it does, then flow continues to block 710 and the client 102 sends its update client information to the other clients 102. Flow then continues to block 712. Returning to block 708, if the error does not exceed an error threshold, flow continues to block 712. In block 712 the client 102 checks to see if client 102 update information has been received from any of the other clients 102. If update information has been received, flow continues to block 714 where the client 102 information is updated. Flow then continues to block 706. Returning to block 712, if no client 102 update information has been received, then flow continues to block 706.

Figure 8:
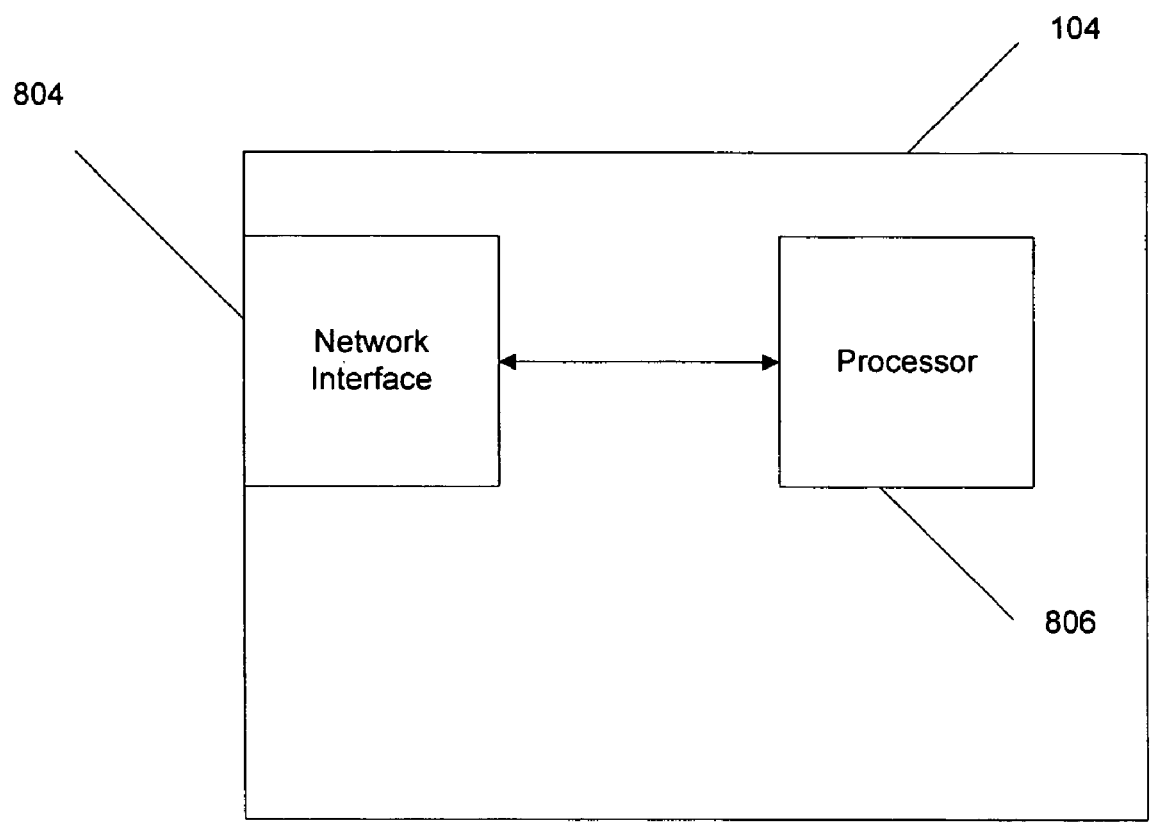
FIG. 8 is a block diagram of an exemplary embodiment of a server in a multi-client game system.

FIG. 8 is a block diagram of an exemplary embodiment of a server 104 in a multi-client game system. As shown in FIG. 8, server 104 includes a network interface 804. In one embodiment, network interface 804 is adapted to receive client information from a client 102 over the Internet or other network 106. The network interface 804 also sends its client information to other clients 102 on the network 106. Additionally, server 104 and network interface 804 are configured to receive client information from clients 102 throughout the duration of the game.

Server 104 additionally comprises a processor 806. The processor 806 may be configured to calculate a dead reckoning position for each client 102 in the multi-client game. The processor 806 may also calculate an error based on a calculated dead reckoning position and an actual position received from a client 102. Server 104 may also determine if an error between the calculated dead reckoning position and an actual position for each client 102 exceeds a threshold for any other client 102 on the network 106. If server 104 determines an error threshold is exceeded it may direct network interface 804 to send update client information to clients 102 whose errors exceed the threshold level for the other clients 102.

Figure 9:
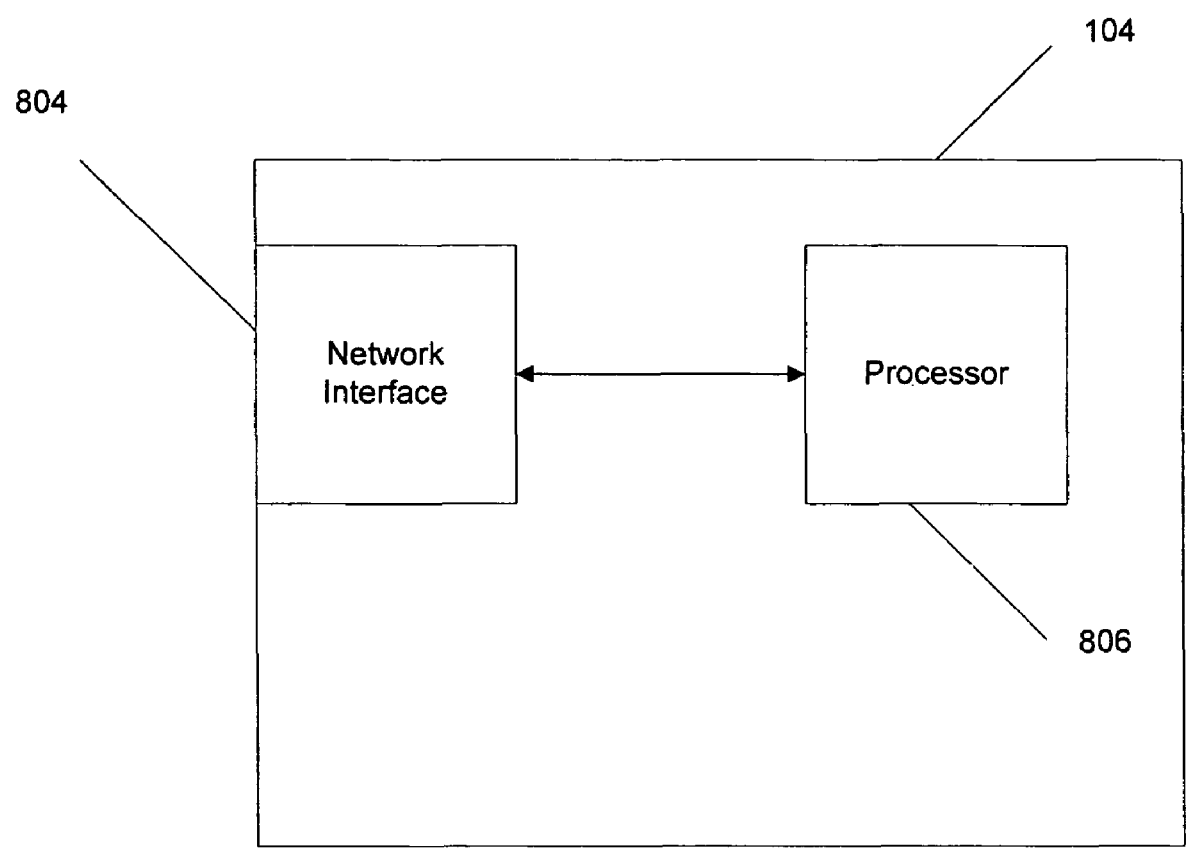
FIG. 9 is a block diagram of an exemplary embodiment of a client in a multi-client game system.

FIG. 9 is a block diagram of an exemplary embodiment of a client in a multi-client game system. As shown in FIG. 9, client 102 includes a network interface 804. In one embodiment network interface 804 is adapted to send client information to server 104 and to receive client information of other clients 102 from server 104. The client information may be sent and received over the Internet or any other network 106. In another embodiment, a peer-to-peer configuration as discussed above, network interface 804 may be configured to send client information directly to other clients 102 on network 106 and receive client information directly from other clients 102 on network 106.

Client 102 also includes a processor 806. Processor 806 may be adapted to calculate a dead reckoning position for each client 102 in the multi-client game. Processor 806 may also be adapted to determine if update client information has been received from server 104, and update client information for a client 102 in response to update client information received from server 104. In an alternate embodiment, processor 806 may be configured to determine if update client information has been received from another client 102. In this embodiment, if update client information is received processor 806 may update client information based on the received information for the other client 102.

In another embodiment, processor 806 may be adapted to calculate a dead reckoning position for its character and the characters of other clients 102 on the network 106. Additionally, processor 806 may be configured to calculate an error based on the calculated dead reckoning position and the actual position of a character for the client 102 and other characters of clients 102 on the network 106. In one embodiment, if a calculated error exceeds a threshold level for any given client 102, processor 806 may direct network interface 804 to send update client information to the other clients 102.

Thus, it is seen that apparatus and methods for communicating client data in a multi-client gaming network are provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

What is claimed is:

1. A method of determining a character's position in a multi-client network game, the method comprising:
    maintaining in server memory a set of error thresholds associated with each client of a plurality of clients in a network, each error threshold in the set being relative to another client of the plurality of clients;

calculating at the server a dead reckoning position of a character associated with a first client from amongst a plurality of clients in the network hosting the multi-client network game, the dead reckoning position calculated by the server based on previously saved first client information received from the first client;

receiving at the server updated first client information, the updated first client information being received from the first client;

determining an actual position of the character based on the updated first client information, the actual position being determined by the server;

adjusting a first set of error thresholds associated with the first client based on processing load of the first client indicated by the updated first client information, the first set of error thresholds associated with the first client being set at the server, each error threshold in the first set being relative to another client in the network;

determining that an error between the actual position and the calculated dead reckoning position of the first client meets an error threshold from a second set of error thresholds associated with a second client from amongst the plurality of clients in the network, the error threshold from the second set being relative to the first client, the determination taking place at the server, the second set of error thresholds associated with the second client being based on second client information and maintained in the server memory; and sending the updated first client information from the server to the second client from the plurality of clients based on the determination that the error meets the error threshold from the second set of error thresholds relative to the first client, wherein updating the first client concerning the second client is based on at least an error threshold from the first set of error thresholds associated with the first client, the error threshold from the first set relative to the second client.

2. The method of claim 1, wherein previously saved first client information is selected from a group consisting of: character position information, character velocity information, character acceleration information, and non-character information.

3. The method of claim 2, wherein the non-character information comprises a busy message.

4. The method of claim 1, wherein the network is selected from a group consisting of a wide area network, a local area network, a wireless network, and the Internet.

5. The method of claim 1, wherein the updated first client information is selected from a group consisting of: character position information, character velocity information, character acceleration information, and non-character information.

6. The method of claim 1, wherein the updated first client information comprises two-dimensional information.

7. The method of claim 1, wherein the updated first client information comprises three-dimensional information.

8. The method of claim 1, wherein the first set of error thresholds associated with the first client comprises a plurality of defined error thresholds associated with the first client, wherein each of the plurality of defined error thresholds is associated with a processing condition of the first client relative to another client in the network.

9. The method of claim 5, wherein the non-character information comprises a busy message.

10. The method of claim 1, wherein calculating the dead reckoning position is further based on a previously saved position and velocity and a time lapse since saving the position and velocity.

11. The method of claim 1, wherein determining that the error between the actual position and the calculated dead reckoning position meets the error threshold from the second set of error thresholds associated with the second client further comprises:

computing an error quantity in at least two dimensions by calculating a difference between the calculated dead reckoning position and the actual position in each dimension;

computing a magnitude of the error quantity by calculating a square-root of a summation of squared error quantity values for each dimension; and comparing the magnitude to the error threshold from the second set of error thresholds associated with the second client relative to the first client.

12. The method of claim 1, wherein each client of the plurality of clients stores a set of error thresholds associated with each of the plurality of clients, each error threshold in the set being relative to another client of the plurality of clients.

13. The method of claim 12, wherein the set of error thresholds includes a default error threshold relative to the another client of the plurality of clients.

14. The method of claim 13 wherein sending the updated first client information further comprises changing the default error threshold associated with the first client relative to the another client and stored by each client of the plurality of clients.

15. The method of claim 1 wherein the network is a client-server network.

16. The method of claim 1, wherein the network is a peer-to-peer network.

17. A method of determining a character's position in a multi-client network game, the method comprising:

maintaining in a first client memory a set of error thresholds associated with each client of a plurality of clients in a network, each error threshold being relative to another client of the plurality of clients;

calculating at the first client a dead reckoning position of a local character associated with the first client in the network based on previously saved first client information, the saved first client information having been previously sent to a second client in the network;

determining an actual position for the character associated with the first client based on updated first client information, the actual position being determined at the first client;

adjusting a first set of error thresholds associated with the first client in the network based on processing load of the first client indicated by the updated first client information, the first set of error thresholds associated with the first client being set at the first client, each error threshold in the first set being relative to another client of the plurality of clients;

determining that an error between the actual position and the calculated dead reckoning position of the first client meets an error threshold from a second set of error thresholds associated with a second client, the error threshold from the second set being relative to the first client, the determination taking place at the first client, the second set of error thresholds associated with the second client being based on second client information and maintained in the first client memory; and sending the updated first client information from the first client to the second client based on the determination that the error meets the error threshold from the second set of error thresholds, wherein updating the first client concerning the second client is based on an error threshold from the first set of error thresholds associated with the first client, the error threshold from the first set being relative to the second client.

18. The method of claim 17, wherein the previously saved first client information is selected from a group consisting of: character position information, character velocity information, character acceleration information, and non-character information.

19. The method of claim 18, wherein the non-character information comprises a busy message.

20. The method of claim 17, wherein the network is selected from a group consisting of: a wide area network, a local area network, a wireless network, and the Internet.

21. The method of claim 17, wherein the updated first client information comprises two-dimensional information.

22. The method of claim 17, wherein the updated first client information comprises three-dimensional information.

23. The method of claim 17, wherein the updated first client information is selected from a group consisting of: character position information, character velocity information, character acceleration information and non-character information.

24. The method of claim 23, wherein the non-character information comprises a busy message.

25. The method of claim 17, wherein calculating the dead reckoning position is further based on a previously saved position and velocity and a time lapse since saving the position and velocity.

26. The method of claim 17, wherein determining that the error between the actual position and the calculated dead reckoning position for the character meets the error threshold from the second set of error thresholds associated with the second client further comprises:
computing an error quantity in at least two dimensions by calculating a difference between the calculated dead reckoning position and an actual position;
computing a magnitude of the error quantity by calculating a square-root of a summation of squared error quantity values for each dimension; and
comparing the magnitude to the error threshold from the second set of error thresholds associated with the second client relative to the first client.

27. The method of claim 17, wherein the first set of error thresholds associated with the first client includes a default error threshold relative to another client of the plurality of clients.

28. The method of claim 27, further comprising:
receiving updated client information from the another client of the plurality of other clients; and
changing the default error threshold associated with the first client and relative to the another client based on the updated client information received from the another client.

29. A system for on-line gaming comprising:
a plurality of clients; and
a server in communication with the plurality of clients in a network, the server configured to:
maintain in memory a set of error thresholds for each client of a plurality of clients in a network, each error threshold being relative to another client of the plurality of clients;
calculate a dead reckoning position for a character associated with a first client of the plurality of clients based on previously received first client information from the first client,
receive updated first client information from the first client,
determine an actual position of the character associated with the first client based on the updated first client information,
adjusting a first set of error thresholds associated with the first client based on processing load of the first client indicated by the updated first client information, each error threshold in the first set being relative to another client of the plurality of clients,
determine that an error between the actual position and the calculated dead reckoning position of the first client meets an error threshold from a second set of error thresholds associated with a second client of the plurality of clients, the error threshold from the second set being relative to the first client, the second set of error thresholds associated with the second client being based on second client information and maintained in memory, and
send the updated first client information to the second client of the plurality of clients based on the determination that the error meets the error threshold from the second set of error thresholds relative to the first client, wherein updating the first client concerning the second client is based on an error threshold from the first set of error thresholds associated with the first client, the error threshold from the first set relative to the second client.

30. The system of claim 29, wherein the previously received first client information is selected from a group consisting of: character position information, character velocity information, character acceleration information, and non-character information.

31. The system of claim 30, wherein the non-character information comprises a busy message.

32. The system of claim 29, wherein the network is selected from a group consisting of a wide area network, a local area network, a wireless network, and the Internet.

33. The system of claim 29, wherein the updated first client information is selected from a group consisting of: character position information, character velocity information, and character acceleration information, and non- character information.

34. The system of claim 29, wherein the updated first client information comprises two-dimensional information.

35. The system of claim 29, wherein the updated first client information comprises three-dimensional information.

36. The system of claim 29, wherein the first set of error thresholds associated with the first client comprises a plurality of defined error thresholds associated with the first client, wherein each of the plurality of defined error thresholds is associated with a processing condition of the first client relative to another client in the network.

37. The system of claim 33, wherein the non-character information comprises a busy message.

38. The system of claim 29, wherein the server is configured to calculate the dead reckoning position further based on a previously saved position and velocity and a time lapse since saving the position and velocity.

39. The system of claim 29, wherein the server is configured to determine that the error between the actual position and the calculated dead reckoning position meets the error threshold from the second set of error thresholds associated with the second client by:
- computing an error quantity in at least two dimensions by calculating the difference between the calculated dead reckoning position and an actual position in each dimension;
- computing a magnitude of the error quantity by calculating a square-root of a summation of squared error quantity values for each dimension; and
- comparing the magnitude to the error threshold from the second set of error thresholds associated with the second client relative to the first client.

40. The system of claim 29, wherein each of the plurality of clients is further configured to store a set of error thresholds associated with each of the plurality of clients, each error threshold in the set being relative to another client of the plurality of clients.

41. The system of claim 40, wherein the set of error thresholds includes a default error threshold relative to another client of the plurality of clients.

42. The system of claim 41, wherein each of the plurality of clients is further configured to update the default error threshold relative to the another client based on the updated information sent from the server regarding the another client.

43. The system of claim 29, wherein the network is a client-server network.

44. A server in an on-line gaming system, the server comprising:
- a memory configured to maintain a set of error thresholds for each client of a plurality of clients in a network, each error threshold being relative to another client of the plurality of clients;
- a network interface adapted to
  - receive updated client information from each client of the plurality of clients over the network, and
  - send the updated client information to other clients on the network;
- wherein the network interface continues to receive updated client information from each client from the plurality of clients during a game; and
- a processor coupled to the network interface, the processor configured to execute instructions stored in memory to:
  - calculate a dead reckoning position for a character associated with each client based on previously received client information,
  - determine an actual position of the character based on the updated client information,
  - adjust a first set of error thresholds associated with a first client based on processing load of the first client indicated by updated client information regarding the first client,
  - determine that an error between the calculated dead reckoning position and the actual position of the client meets an error threshold from a second set of error thresholds associated with a second client of the plurality of clients, the error threshold from the second set of error thresholds being relative to the first client, the second set of error thresholds associated with the second client being based on second client information and maintained at the server, and
  - send the updated client information to the second client of the plurality of clients based on the determination that the error meets the error threshold from the second set of error thresholds relative to the first client, wherein updating the client concerning the another client is based on an error threshold from the first set of error thresholds associated with the first client, the error threshold from the first set relative to the second client.

45. The server of claim 44, wherein the previously received client information is selected from a group consisting of: a character position, a character velocity, a character acceleration, and non-character information.

46. The server of claim 45, wherein the non-character information comprises a busy message.

47. The server of claim 44, wherein the network is selected from a group consisting of: a wide area network, a local area network, a wireless network, and the Internet.

48. The server of claim 44, wherein the updated client information is selected from a group consisting of: character position information, character velocity information, character acceleration information, and non-character information.

49. The server of claim 44, wherein the updated client information comprises two-dimensional information.

50. The server of claim 44, wherein the updated client information comprises three-dimensional information.

51. The server of claim 44, wherein the first error threshold associated with the first client comprises a plurality of defined error thresholds, wherein each of the plurality of defined error thresholds is associated with a processing condition of the first client relative to another client of the plurality of clients.

52. The server of claim 48, wherein the non-character information comprises a busy message.

53. The server of claim 44, wherein the processor is configured to execute instructions to calculate the dead reckoning position further based on a previously saved position and velocity and a time lapse since saving the position and velocity.

54. The server of claim 44, wherein the processor is further configured to execute instructions to determine that the error between the actual position and the calculated dead reckoning position meets the error threshold from the second set of error thresholds associated with the second client by:
- computing an error quantity in at least two dimensions by calculating the difference between the calculated dead reckoning position and an actual position;
- computing a magnitude of the error quantity by calculating a square-root of a summation of squared error quantity values for each dimension; and
- comparing the magnitude to the error threshold from the second set of error thresholds associated with the second client relative to the first client.

55. The server of claim 54, wherein each client of the plurality of clients stores a set of error thresholds associated with each of the plurality of clients, each error threshold in the set being relative to another client of the plurality of clients.

56. The server of claim 54, wherein the set of error thresholds includes a default error threshold for each of the plurality of clients relative to another client of the plurality of clients.

57. The server of claim 56, wherein each client of the plurality of clients changes the default error threshold based on the updated client information regarding the another client sent from the processor.

58. The server of claim 54, wherein the network is a client-server network.

59. A client in an on-line gaming system, the client comprising:
- a memory configured to maintain a set of error thresholds for each client of a plurality of clients in a network, each error threshold being relative to another client of the plurality of clients;
- a network interface adapted to send local client information to other clients through the network; and a processor coupled to the network interface, the processor configured to execute instructions to:
- calculate a dead reckoning position for a local character associated with the client based on previously saved local client information, the previously saved local client information having been sent to the other clients,
- determine an actual position of the local character based on updated local client information,
- adjust a first set of error thresholds associated with the local client based on processing load of the first client indicated by the updated local client information, each error threshold in the first set being relative to another client in the network,
- determine that an error between the calculated dead reckoning position and the actual position of the local client meets an error threshold from a second set of error thresholds associated with a remote client, the error threshold from the second set being relative to the local client, the second set of error thresholds associated with the remote client being based on remote client information and maintained at the local client, and
- send the updated local client information message to the remote client based on the determination that the error meets the error threshold from the second set of error thresholds, wherein updating the local client concerning the remote client is based on an error threshold from the first set of error threshold associated with the local client, the error threshold from the first set relative to the remote client.

60. The client of claim 59, wherein the previously saved local client information is selected from a group consisting of: character position information, character velocity information, character acceleration information, and non-character information.

61. The client of claim 60, wherein the non-character information comprises a busy message.

62. The client of claim 59, wherein the network is selected from a group consisting of: a wide area network, a local area network, a wireless network, and the Internet.

63. The client of claim 59, wherein the previously saved local client information comprises two-dimensional information.

64. The client of claim 59, wherein the previously saved local client information comprises three-dimensional information.

65. The client of claim 59, wherein the updated local client information is selected from a group consisting of: character position information, character velocity information, character acceleration information and non-character information.

66. The client of claim 59, wherein the non-character information comprises a busy message.

67. The client of claim 59, wherein the processor is further configured to execute instructions to calculate the dead reckoning position further based on a previously saved position and velocity and a time lapse since saving the position and velocity.

68. The client of claim 59, wherein the processor is further configured to execute instructions to determine that the error between the actual position and the calculated dead reckoning position for the first client meets the error threshold from the second set of error thresholds associated with the remote client by:
- computing an error quantity in at least two dimensions by calculating a difference between the calculated dead reckoning position and the actual position;
- computing a magnitude of the error quantity by calculating a square-root of a summation of squared error quantity values for each dimension; and
- comparing the magnitude to the error threshold from the second set of error thresholds associated with the remote client relative to the local client.

69. The client of claim 59, wherein the set of error thresholds maintained in memory includes a default error threshold relative to another client of the plurality of clients.

70. The client of claim 69, wherein the memory is further configured to update the default error threshold based on updated client information received from the another client of the plurality of other clients.

\* \* \* \* \*